Sept. 22, 1931.  W. McKEE  1,824,439
HOTBED
Filed Aug. 28, 1929   2 Sheets-Sheet 2

INVENTOR
WILLIS McKEE
BY
Richey & Watts
ATTORNEYS

Patented Sept. 22, 1931

1,824,439

UNITED STATES PATENT OFFICE

WILLIS McKEE, OF CLEVELAND, OHIO, ASSIGNOR TO THE CENTRAL UNITED NATIONAL BANK, A CORPORATION OF THE UNITED STATES

HOTBED

Application filed August 28, 1929. Serial No. 388,920.

This invention has to do with cooling beds such as are used for handling hot iron, steel or other metallic articles and the like and is primarily concerned with certain novel apparatus for conveying and manipulating such articles while they are in a heated condition in which they may be easily deformed during the handling.

This invention has in view the providing of an apparatus which will maintain the material being handled in a separated condition so as to facilitate the cooling action, and which tends to straighten out the articles being handled rather than deform them out of shape as has heretofore been the case in apparatus of this type.

More in detail, the instant invention comprehends the provision of mechanism of novel construction for receiving the hot articles on a conveying bed and maintaining the individuality of the articles during the operation of the handling mechanism.

Another proposition of importance to the instant invention is that of providing two sets of handling apparatus which are arranged in a pair and are associated with a central runout for supplying the bars to the beds. The arrangement of conveying apparatus in pairs also makes possible the use of a novel type of mechanism for actuating the beds on the counterbalancing principle which is a feature of paramount importance.

Figure 1:
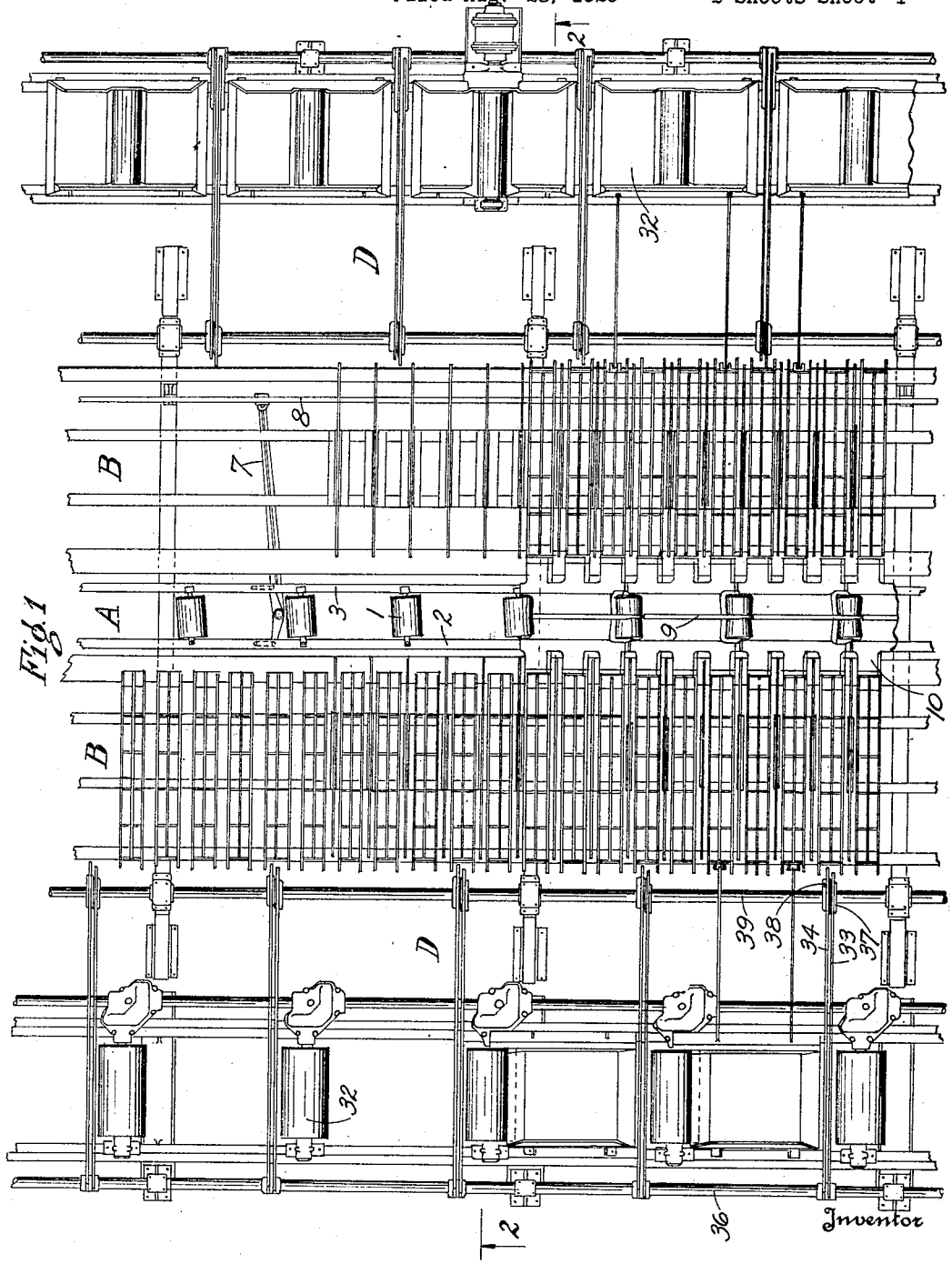
Figure 2:
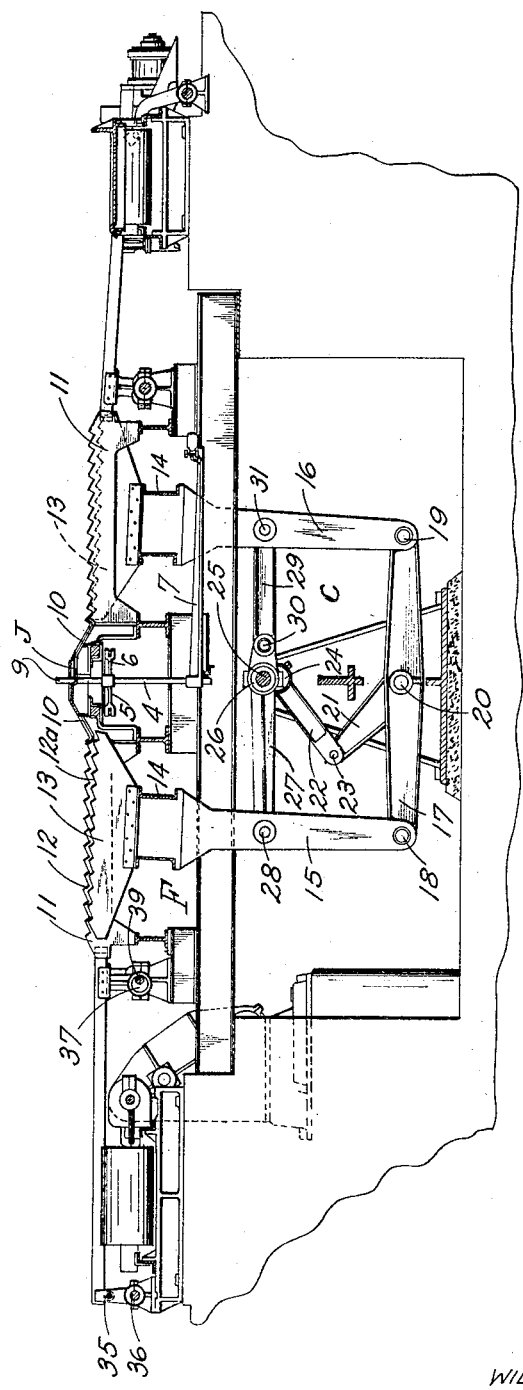

Other more detailed objects and advantages will in part become apparent and in part be stated as the description of the invention proceeds. For a full and more complete understanding thereof, reference may be had to the following description and accompanying drawings wherein, Figure 1 is a plan view, somewhat diagrammatic of apparatus constructed in accordance with this invention, and Figure 2 is a transverse section taken about on the line 2—2 of Figure 1.

Referring now to the drawings, the apparatus includes, as essential parts thereof, certain mechanisms, to wit, the central runout assembly designated generally A, the pair of stationary conveyor beds referred to in their entirety by the reference character B, the operating or moving mechanism C for the beds B, and the apparatus for receiving the material being handled from the beds and transferring them to conveyor rollers. The two transferring assemblies shown in the present embodiment are designated D.

The central runout A comprises a table J through the top of which projects a series of rollers which are swingably mounted at each end in the longitudinally extending bars 2 and 3 located below the table J. These bars 2 and 3 are movable lengthwise to vary the angularity of the rollers 1. The mechanism for this operation includes a shaft 4 to which is non-rotatably fastened the arms 5 and 6. The arm 5 is fastened to the bar 2 and the arm 6 to the bar 3 by links. As the shaft 4 rotates the arm 5 is moved in one direction and the arm 6 in the opposite direction. This action, of course, entails a corresponding movement on the part of the bars 2 and 3. Keyed to the lower end of the shaft 4 is a link 7 which is secured at its outer end to a rod 8 which constitutes operating means for changing the angularity of the rollers 1.

A central partition member 9 is positioned centrally of the table J and rollers 1 and thereabove and is adapted to have the material being handled thrown thereagainst when the rollers 1 are in the proper angular disposition. Aprons 10 are located between adjacent table rollers and have inclined sides down which the material slides against a continuous stop.

Briefly describing the operation of the central runout assembly A it is noted that an article is first fed onto the table and rollers 1 on one side of the partition 9. The rollers 1 are positioned at a slight angle to a line perpendicular to the central guide to urge the article against the central member 9. When the article has reached the desired discharge position on the rollers 1 the angularity of the latter is reversed to a maximum to quickly throw the article away from the partition 9 on to the apron 10. The angularity of the rollers is then reduced so that they are skewed just sufficiently to urge a subsequent article against the other side of the partition 9. The switch mechanism for feeding the material to alternately opposite sides of the member 9 is not herein disclosed as it is not a part of the present invention. A mechanism for this purpose is fully shown and described in my copending application, Serial No. 93,134, filed March 8, 1926.

The conveyor beds B are of duplicate construction so only one of them is herein described for the purposes of this description. One of the beds B comprises a series of stationary bars 11 which are spaced apart and fixedly mounted on the supporting framework of the apparatus which is referred to generally as F. The bars 11 are notched as shown at 12 to provide individual supporting and aligning means for each piece of material handled by the bed.

Disposed in the spaces between the fixed bars 11 are movable bars 13 which are mounted on the supporting members 14 which are movable under the influence of the operating mechanism C to be later described in detail. The movable bars 13 are also provided with notches 12ª. The apron 10 receives in its notches a piece of material delivered from the central runout A. The movable bars 13 are then actuated through a half cycle to move the piece from the notch of apron 10 to the next notch 12 of the fixed bars. Continued actuation of the movable bars moves the piece across the bed and finally delivers it to the mechanism D.

The mechanism C for operating the conveyor beds B comprises two series of substantially vertically disposed members 15 and 16, each of which carries at its upper end one of the supports 14. At their lower end the members 15 and 16 are pivotally mounted on a rocking member 17 at the extremities thereof as shown at 18 and 19. The member 17 is non-rotatably mounted on a shaft 20 which is properly supported in the framework F. The reference character F is intended to designate all the immovable supporting structure on which the operating parts are mounted. This includes the lower triangular structure as well as the main horizontal supporting construction. An arm 21 is keyed to the rock shaft 20 and at its free end is pivotally connected with a link 22 as shown at 23. The link 22 at its other end receives an eccentric 24 carried by a main drive shaft 25. The latter is mounted in the supporting framework F and may be driven from any suitable power source. This shaft 25 also carries a second eccentric 26 which is received in a complemental opening in a link member 27. At one end the latter is pivotally connected to the member 15 as shown at 28 and at the other end to a connecting rod 29 as shown at 30. The member 29 is pivotally connected to member 16 as at 31.

The mechanism C, it is noted, is actuated or driven from a single drive shaft. Not only does this provide a simplified construction, but a saving in power is afforded and the operation rendered smooth.

Rotation of the shaft 25 imparts to the bars 13 in the beds B elliptical movements which are substantially counterparts, as described in the preceding paragraph. As the member 15 moves downwardly, link 27 pivots it about pivot 18. At the same time member 16 moves upwardly, and is pivoted about pivot 19 by link 29 in a direction opposite to that of member 15. These two movements imparted to the supports 14 combine to provide the elliptical orbits which are the resultants of these lateral and vertical movements. The horizontal axes of the moving orbits are below the top of the fixed bar. The bed makes only one-half a revolution and then stops. This raises, advances and lowers the material on one side while the moving members on the other side are moving below the stationary bars towards the central runout to a position preparatory to raising, advancing and lowering the material on that side in the next operation of the bed. As the bars 13 of one bed B are picking up the material being handled and carrying it to the next notch 12 by movement above the fixed bars 11 outwardly from the central runout, the bars 13 in the other bed B are being returned by a movement below the fixed bars 11 and towards the central runout, to the position wherein they can lift the material from the fixed bars 11. It is notable that as the movable bars 13 travel in their prescribed paths the angularity of the bars 13 with respect to the horizontal varies due to the pivotal arrangement 18, 19, 28 and 31.

It is noteworthy that the mechanism of one bed B counterbalances that of the other bed so that no power is wasted in lifting the moving parts of the bed. As a result of this arrangement a much smaller amount of power is consumed in handling the material. For each operation the only power necessary, outside of overcoming inertia and friction, is that required to actually lift the material being shifted.

The mechanisms D which receive material from the bed B and transfers it to conveyor rollers 32 are of duplicate construction and each of them comprises a series of pairs of shuffle bars 33 and 34. These bars slide at one end on supporting members 35 which are carried by a rockable shaft 36. At their other ends the bars 33 and 34 each receive oppositely disposed eccentrics 37 and 38. These eccentrics are carried by a shaft 39 which may be driven from a suitable power source. As the shaft 39 rotates the bars 33 and 34 move alternately up and down and lengthwise, one set of bars always supporting the material independently of the other. The shuffle bars which support the material will always be moving outwardly with the load with respect to the central runway. Hence, the material is moved out to the place where it is received by the conveyor rollers 32 to be transferred to a desired place. By the time the material has reached the shuffle bars, it is cooled sufficiently to obviate the liability of deformation due to handling.

I show on the left of the plan view a table for handling the cold material which is of the usual construction having a line shaft and gearing. On the right side I show an alternate construction in which I use a magnetic roller as disclosed in my patent application Serial No. 220,111, filed September 27, 1927. In this connection the magnetic rollers are spaced 35' to 40' apart with idlers between them. This eliminates the line shaft and the necessity of keeping the table lined up. It also greatly decreases maintenance cost.

The operation of the entire apparatus may be briefly summed up as follows: Material in the form of heated bars are alternately fed to the central runout A on opposite sides of the member 9. The rollers 1, which are of the type described in my application Serial No. 93,134, filed March 8, 1926, are properly operated through the medium of member 8 to throw the bars onto aprons 10. The notches 12 maintain the heated bars separated and due to the movement thereof from notch to notch the heated bars are straightened. This straightening of the material being handled is due to the facts that these notches are all inclined and to the slight falling action of the material as it is set into the aligned notches of the fixed bars by the movable ones. The edges of the notches engage the material with sufficient force to straighten out the material if it should be warped or curved due to rolling or previous handling. From the beds B the bars are transferred to the mechanism D and by the latter to the rollers 32.

What I claim is:

1. Mechanism of the class described, comprising, in combination, two series of fixed supports, two series of supports movable in orbits so as to convey material in opposite directions and means for operating both series of movable supports simultaneously, consisting of a single drive shaft, a pair of cam means carried on the shaft, and connections between each of the cam means and each series of movable supports.

2. Mechanism of the class described, comprising, in combination, a series of fixed supports, a series of movable supports and means for operating the movable supports consisting of a shaft, a pair of cam means carried on the shaft, and connections between each of the cam means and the series of movable supports, one of the cam means being adapted to impart to the supports a vertical component of movement while the other cam means imparts a horizontal component of movement to the supports, and means for resolving the two components of movement into a resultant of the two, said means including linkage for moving one group of movable supports upwardly in one direction, while at the same time moving another group downwardly in the same direction.

3. Apparatus of the class described comprising in combination, a pair of beds, each bed comprising a series of fixed bars and a series of movable bars, the movable bars being disposed between the fixed bars, a drive shaft a rock shaft, a set of rocker members mounted at points intermediate their ends on said rock shaft, sets of upwardly extending links pivotally connected to the outer ends of said rocker members and each set supporting a series of the movable bars and means directly connected to said drive shaft for rocking said rock shaft.

4. Apparatus of the class described, comprising in combination, a pair of beds, each bed comprising a series of fixed bars and a series of movable bars, the movable bars being disposed between the fixed bars, a drive shaft, a rock shaft, a set of rocker members mounted at points intermediate their ends on said rock shaft, sets of upwardly extending links pivotally connected to the outer ends of said rocker members and each set supporting a series of the movable bars, means for rocking said rocker members to cause vertical movement of said movable bars, and means directly connected to said drive shaft for causing horizontal movement of said movable bars.

5. Apparatus of the class described, comprising in combination, a pair of beds, each bed comprising a series of fixed bars and a series of movable bars, the movable bars being disposed between the fixed bars, a drive shaft, a rock shaft, a set of rocker members mounted at points intermediate their ends on said rock shaft, sets of upwardly extending links pivotally supported by the outer ends of said rocker members, each set supporting a series of the movable bars, means for rocking said rocker members to cause vertical movement of said movable bars, and means directly connected to said drive shaft and pivotally connected to said supporting links for causing horizontal movement of said movable bars.

6. Apparatus of the class described, comprising in combination, a pair of beds, each bed comprising a series of fixed bars and a series of movable bars, the movable bars being disposed between the fixed bars, a drive shaft, a rock shaft, means connecting said rock shaft to said drive shaft for rocking said rock shaft, a set of rocker members mounted at points intermediate their ends on said rock shaft, sets of upwardly extending links pivotally supported by the outer ends of said rocker members, each set supporting a series of the movable bars, means for rocking said rocker arms to cause vertical movement of said movable bars, and means directly connected to said drive shaft for causing horizontal movement of said movable bars.

7. Mechanism of the class described comprising in combination two series of fixed supports, two series of movable supports, each series of movable supports being supported on a single series of movable links, a drive shaft and means connecting said drive shaft to said movable links for imparting elliptical motion to said movable supports.

8. Mechanism of the class described comprising in combination two series of fixed supports, two series of movable supports, each series of movable supports being supported on a single series of movable links, a drive shaft and means connected directly to said drive shaft and to said movable links for causing horizontal movement of the latter and of said movable supports.

9. Mechanism of the class described comprising two sets of fixed bars, two sets of movable bars associated therewith, a series of rocker members pivoted intermediate their ends, a drive shaft, means directly connecting said drive shaft to said rocker members for rocking the latter, and a single series of upright links for each set of movable bars, the series of links being pivoted to said series of rocker members near the opposite ends of the latter, each series of upright links supporting a set of movable bars.

10. Mechanism of the class described comprising two sets of fixed bars, two sets of movable bars associated therewith, a series of rocker members pivoted intermediate their ends, a drive shaft, means connecting said drive shaft, to said rocker members for rocking the latter, and a single series of upright links for each set of movable bars, the series of links being pivoted to said series of rocker members near the opposite ends of the latter, means directly connected to said drive shaft and said upright links for causing horizontal movement of the latter, each series of upright links supporting a set of movable bars.

In testimony whereof I hereunto affix my signature this 19th day of August, 1929.

WILLIS McKEE.